(No Model.)
R. J. COOKE.
FRUIT BOX.
No. 248,143.  Patented Oct. 11, 1881.
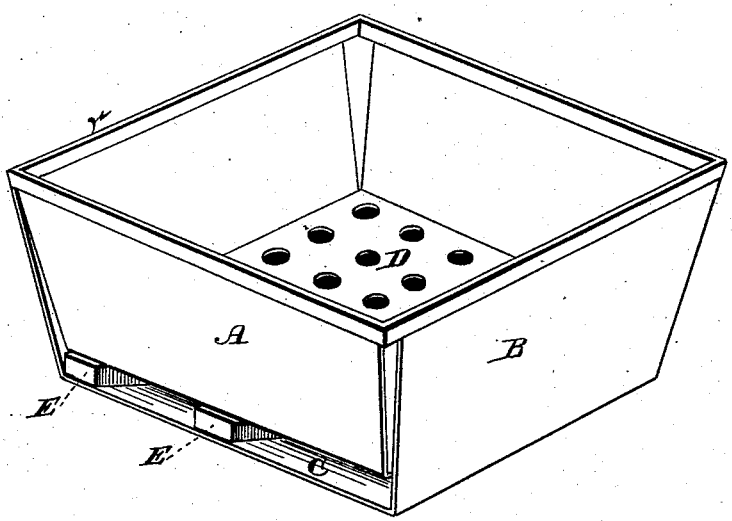
Witnesses,
Geo. H. Strong,
Frank B. Brooks
Inventor,
Robert J. Cooke
By Dewey & Co.
Att'ys

UNITED STATES PATENT OFFICE.

ROBERT J. COOKE, OF SACRAMENTO, CALIFORNIA.

FRUIT-BOX.

SPECIFICATION forming part of Letters Patent No. 248,143, dated October 11, 1881.

Application filed March 24, 1881. (No model.)

*To all whom it may concern:*

Be it known that I, ROBERT J. COOKE, of the city and county of Sacramento, State of California, have invented an Improvement in Fruit-Boxes; and I hereby declare the following to be a full, clear, and exact description thereof.

My invention relates to certain improvements in that class of boxes or baskets which are made of strips of thin light material or veneer, and which are generally used for packing berries, grapes, and small fruits.

It consists in the construction of a double floor, the inner portion of which is perforated and is sufficiently distant from the other to allow a free circulation of air between the two. By the peculiar manner of constructing and connecting these two floors or bottoms I am enabled to make a very rigid box without the use of any other device or attachment.

Referring to the accompanying drawings for a more complete description of my invention, the figure shown is a perspective view of my basket.

I construct my box of two thin veneers, A and B, each of which is bent twice, so as to form the angles between the bottom and the sides. One of these veneers crosses the other at right angles, so that the four corners are formed by the meeting sides, and their upper edges clamped between a sheet-metal rim, $r$, as shown in the ordinary construction of these boxes. In my box, however, instead of having one bottom cross the other in close proximity, the sides B of one of the boxes are made longer than the sides A of the other. In consequence of this the bottom C will be at a corresponding distance below the bottom D, thus having a space between them. The bottom D is perforated with holes which communicate with the space between the two bottoms, so that the fruit in the bottom of the box may be ventilated through the openings, and has as free communication with the air as that at the top, and will thus be preserved from the deterioration which first commences at the bottom in close boxes.

In order to unite the two bottoms without interrupting the circulation, and also to stiffen the whole box, I employ strips E of a thickness equal to the space between the bottoms. These strips may be put in straight across; but I prefer to nail them in diagonally, as shown, so that the thin veneer of the inner bottom, D, will be supported across its grain and prevented from sagging by the weight of the fruit. This diagonal bracing of the two bottoms, which are both secured to the diagonal strips, so stiffens the whole box that I can dispense with corner-braces or other supports usually deemed necessary in such boxes. In this case holes will also be made in the sides of the box below the ventilating-bottoms, to permit the circulation of air.

These boxes will allow a free circulation of air above and below, and will preserve all parts of their contents equally fresh, besides greatly strengthening the box, which is ordinarily very frail.

Having thus described my invention, what I claim as new, and desire to secure by Letters Patent, is—

1. The box composed of veneers or thin material bent and arranged to form the sides, and spaced double bottom C D, as shown, the sides B being longer than the sides A, and the inner bottom being perforated, substantially as shown and described.

2. The box composed of veneers bent and arranged to form the sides A B, and double bottom C D, in combination with the braces E, inserted between the lower bottom and the perforated bottom D, for the purpose specified.

In witness whereof I have hereunto set my hand.

ROBERT JOHN COOKE.

Witnesses:
 ED. M. MARTIN,
 MATTHEW COOKE.